United States Patent
Surineedi et al.

(10) Patent No.: US 12,235,357 B2
(45) Date of Patent: Feb. 25, 2025

(54) SENSOR ASSEMBLY WITH CONCAVE SURFACE

(71) Applicant: Ford Global Technologies, LLC, Dearborn, MI (US)

(72) Inventors: Raghuraman Surineedi, Dearborn, MI (US); Segundo Baldovino, Novi, MI (US); Venkatesh Krishnan, Canton, MI (US)

(73) Assignee: Ford Global Technologies, LLC, Dearborn, MI (US)

(*) Notice: Subject to any disclaimer, the term of this patent is extended or adjusted under 35 U.S.C. 154(b) by 996 days.

(21) Appl. No.: 17/223,039

(22) Filed: Apr. 6, 2021

(65) Prior Publication Data
US 2022/0317297 A1 Oct. 6, 2022

(51) Int. Cl.
*G01S 17/08* (2006.01)
*B60S 1/54* (2006.01)
*G01S 7/481* (2006.01)

(52) U.S. Cl.
CPC ............... *G01S 17/08* (2013.01); *B60S 1/54* (2013.01); *G01S 7/4813* (2013.01)

(58) Field of Classification Search
CPC .......... B60S 1/54; G01S 7/027; G01S 7/4813; G01S 13/931; G01S 2013/93273; G01S 17/08; G01S 17/88; G01S 17/93; G01S 17/931
See application file for complete search history.

(56) References Cited

U.S. PATENT DOCUMENTS

| | | | |
|---|---|---|---|
| 6,944,908 B2 | 9/2005 | Hoetzer et al. | |
| 7,344,183 B2 | 3/2008 | Brash | |
| 9,707,896 B2 | 7/2017 | Boegel et al. | |
| 10,744,979 B2 | 8/2020 | Schmidt et al. | |
| 10,843,533 B2* | 11/2020 | Biancalana | B60J 1/2005 |
| 2012/0242837 A1* | 9/2012 | Sasagawa | G03B 37/04 348/E7.085 |
| 2017/0036647 A1 | 2/2017 | Zhao et al. | |
| 2017/0297536 A1 | 10/2017 | Giraud et al. | |
| 2019/0359147 A1* | 11/2019 | Zajac | B60R 11/04 |
| 2020/0142036 A1* | 5/2020 | Karplus | G01S 7/4817 |
| 2020/0148133 A1* | 5/2020 | Lin | B60S 1/54 |
| 2020/0387174 A1 | 12/2020 | Diehl et al. | |
| 2020/0398765 A1 | 12/2020 | Krishnan et al. | |
| 2021/0025983 A1 | 1/2021 | Patil et al. | |
| 2021/0162958 A1* | 6/2021 | Kim | B60S 1/524 |

FOREIGN PATENT DOCUMENTS

| | | | |
|---|---|---|---|
| CN | 212160088 U | * | 12/2020 |
| DE | 102015210469 A1 | | 12/2016 |
| JP | 2015104933 A | | 6/2015 |
| WO | WO-2017119385 A1 | * | 7/2017 |

* cited by examiner

*Primary Examiner* — Yuqing Xiao
*Assistant Examiner* — Benjamin Richard Hebert
(74) *Attorney, Agent, or Firm* — Frank A. MacKenzie; Brooks Kashman P.C.

(57) ABSTRACT

A sensor assembly includes a housing mountable to a vehicle and a sensor mounted to the housing on top of the housing. The housing includes a front panel. The front panel includes a front surface on an exterior of the housing. The front surface is concave along a vertical axis and concave along a horizontal axis orthogonal to the vertical axis. The front surface is wider than the sensor along the horizontal axis.

19 Claims, 4 Drawing Sheets

SENSOR ASSEMBLY WITH CONCAVE SURFACE

BACKGROUND

Vehicles typically include sensors. The sensors can provide data about operation of the vehicle, for example, wheel speed, wheel orientation, and engine and transmission data (e.g., temperature, fuel consumption, etc.). The sensors can detect the location and/or orientation of the vehicle. The sensors can be global positioning system (GPS) sensors; accelerometers such as piezo-electric or microelectromechanical systems (MEMS); gyroscopes such as rate, ring laser, or fiber-optic gyroscopes; inertial measurements units (IMU); and/or magnetometers. The sensors can detect the external world, e.g., objects and/or characteristics of surroundings of the vehicle, such as other vehicles, road lane markings, traffic lights and/or signs, pedestrians, etc. For example, the sensors can be radar sensors, scanning laser range finders, light detection and ranging (LIDAR) devices, and/or image processing sensors such as cameras.

DETAILED DESCRIPTION

Figure 1:
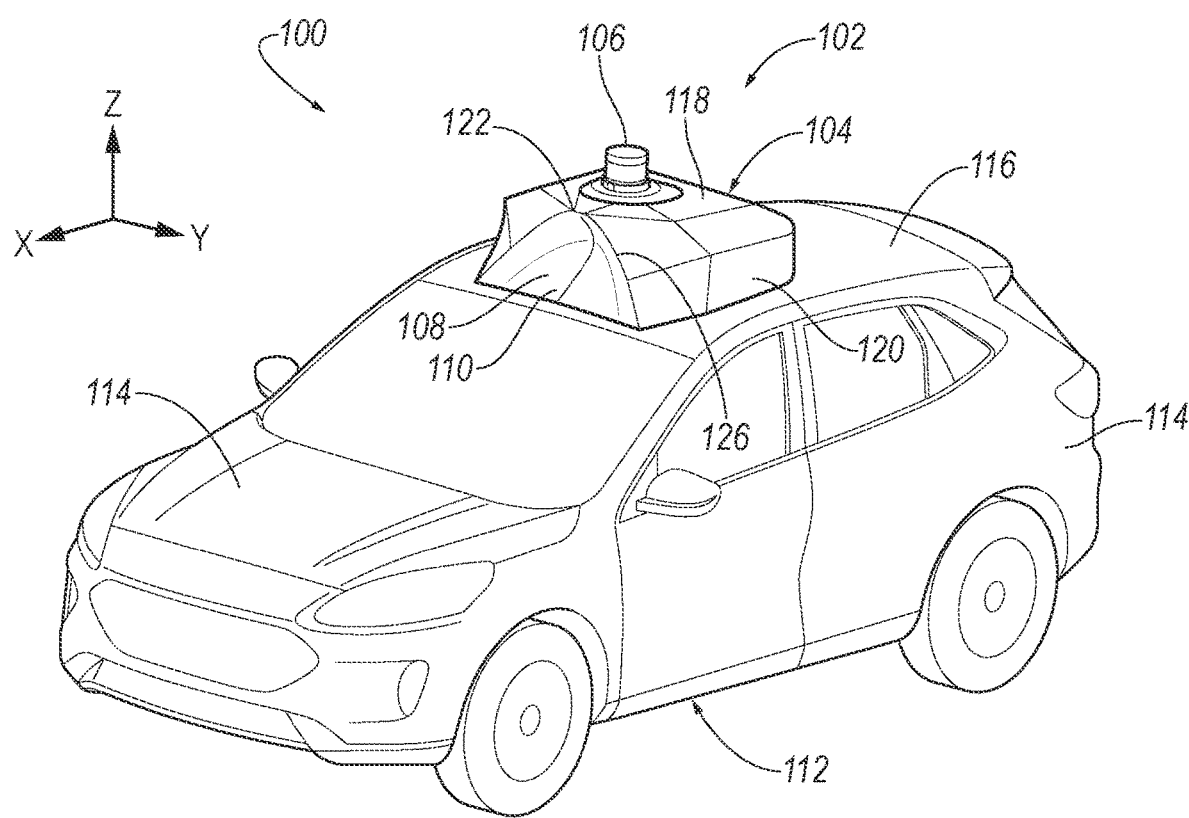
FIG. 1 is a perspective view of an example vehicle with an example sensor assembly.

A sensor assembly includes a housing mountable to a vehicle and a sensor mounted to the housing on top of the housing. The housing includes a front panel. The front panel includes a front surface on an exterior of the housing. The front surface is concave along a vertical axis and concave along a horizontal axis orthogonal to the vertical axis. The front surface is wider than the sensor along the horizontal axis.

The housing may include a top panel to which the sensor is mounted, the top panel may border the front panel, and the front surface may extend underneath the top panel. The sensor assembly may further include at least one air nozzle mounted to the top panel adjacent to the sensor. The at least one air nozzle may be oriented to discharge vertically.

The sensor may be cylindrical and defines an axis parallel to the vertical axis.

The front surface may be taller than the sensor along the vertical axis.

The horizontal axis may be a lateral horizontal axis, the front surface may include an outer edge, the front surface may include a rearmost point along a longitudinal horizontal axis orthogonal to the lateral horizontal axis and to the vertical axis, and the rearmost point of the front surface may be spaced from the outer edge of the front surface. The outer edge of the front surface may include a topmost point and a bottommost point along the vertical axis, and the topmost and bottommost points may be forward of the rearmost point along the longitudinal horizontal axis. The front surface may smoothly curve from the rearmost point to the topmost point and from the rearmost point to the bottommost point.

A line normal to the front surface at the rearmost point and a line normal to the front surface at the topmost point may define an angle projected onto a vertical plane that is parallel to the vertical axis and parallel to the longitudinal horizontal axis, and the angle may be at least 15°. The angle may be at most 35°.

A line normal to the front surface at the rearmost point and a line normal to the front surface at the bottommost point may define an angle projected onto a vertical plane that is parallel to the vertical axis and parallel to the longitudinal horizontal axis, and the angle may be at least 15°. The angle may be at most 35°.

The sensor may be completely above the topmost point along the vertical axis.

The outer edge of the front surface may include a leftmost point and a rightmost point along the lateral horizontal axis, and the leftmost and rightmost points may be forward of the rearmost point along the longitudinal horizontal axis. The front surface may smoothly curve from the rearmost point to the leftmost point and from the rearmost point to the rightmost point.

A line normal to the front surface at the rearmost point and a line normal to the front surface at the leftmost point may define an angle projected onto a horizontal plane that is parallel to the lateral horizontal axis and parallel to the longitudinal horizontal axis, and the angle may be at least 15°. The angle may be at most 35°.

The rearmost point may be in a vertical plane that is parallel to the vertical axis and parallel to the longitudinal horizontal axis, and the front surface may be symmetrical across the vertical plane.

The sensor may be completely between the leftmost point and the rightmost point along the lateral horizontal axis.

With reference to the Figures, wherein like numerals indicate like parts throughout the several views, a sensor assembly 102 includes a housing 104 mountable to a vehicle 100 and a sensor 106 mounted to the housing 104 on top of the housing 104. The housing 104 includes a front panel 108. The front panel 108 includes a front surface 110 on an exterior of the housing 104. The front surface 110 is concave along a vertical axis Z and concave along a lateral horizontal axis Y orthogonal to the vertical axis Z. The front surface 110 is wider than the sensor 106 along the lateral horizontal axis Y.

Figure 3:
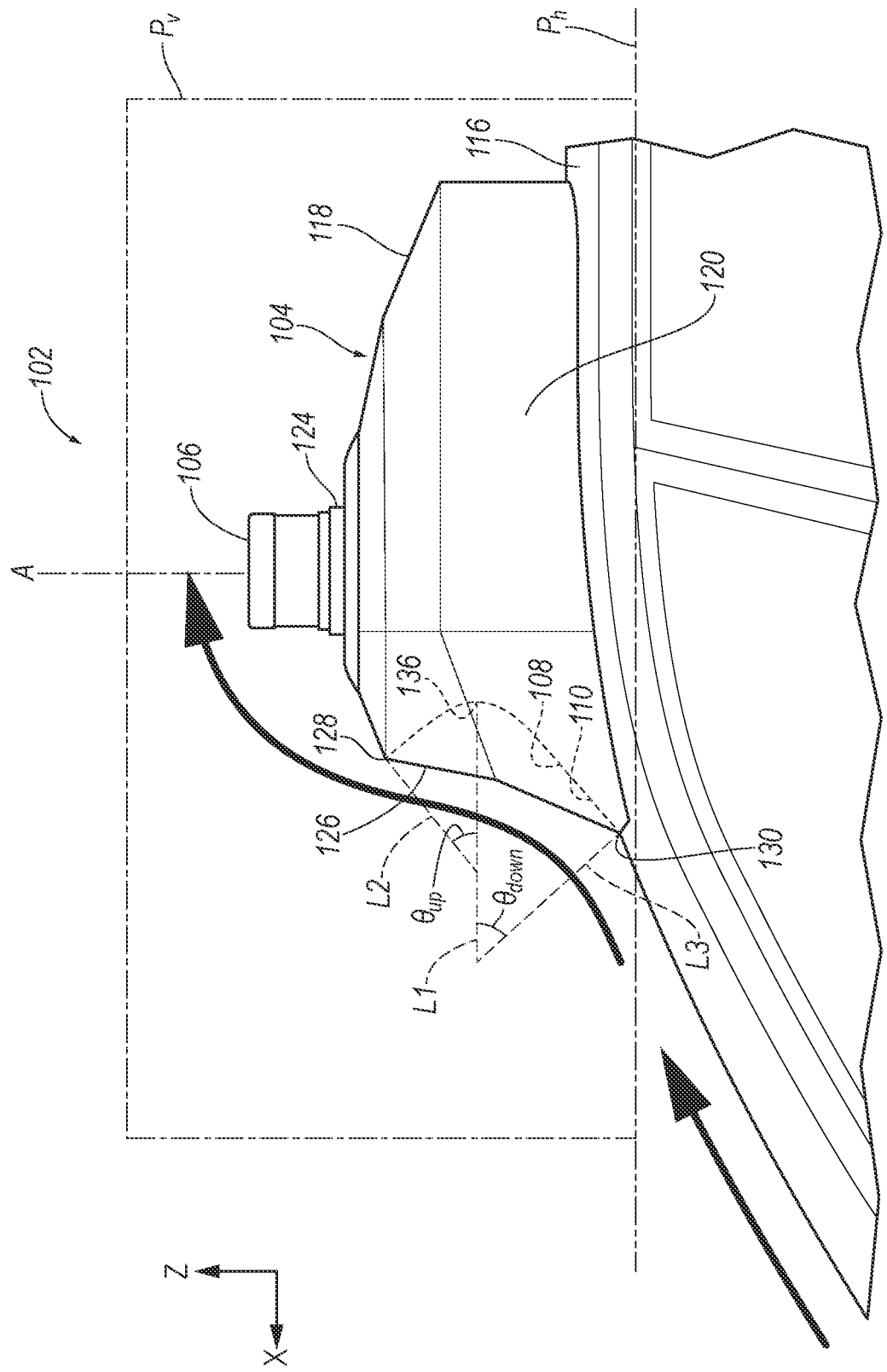
FIG. 3 is a side view of the sensor assembly.
Figure 4:
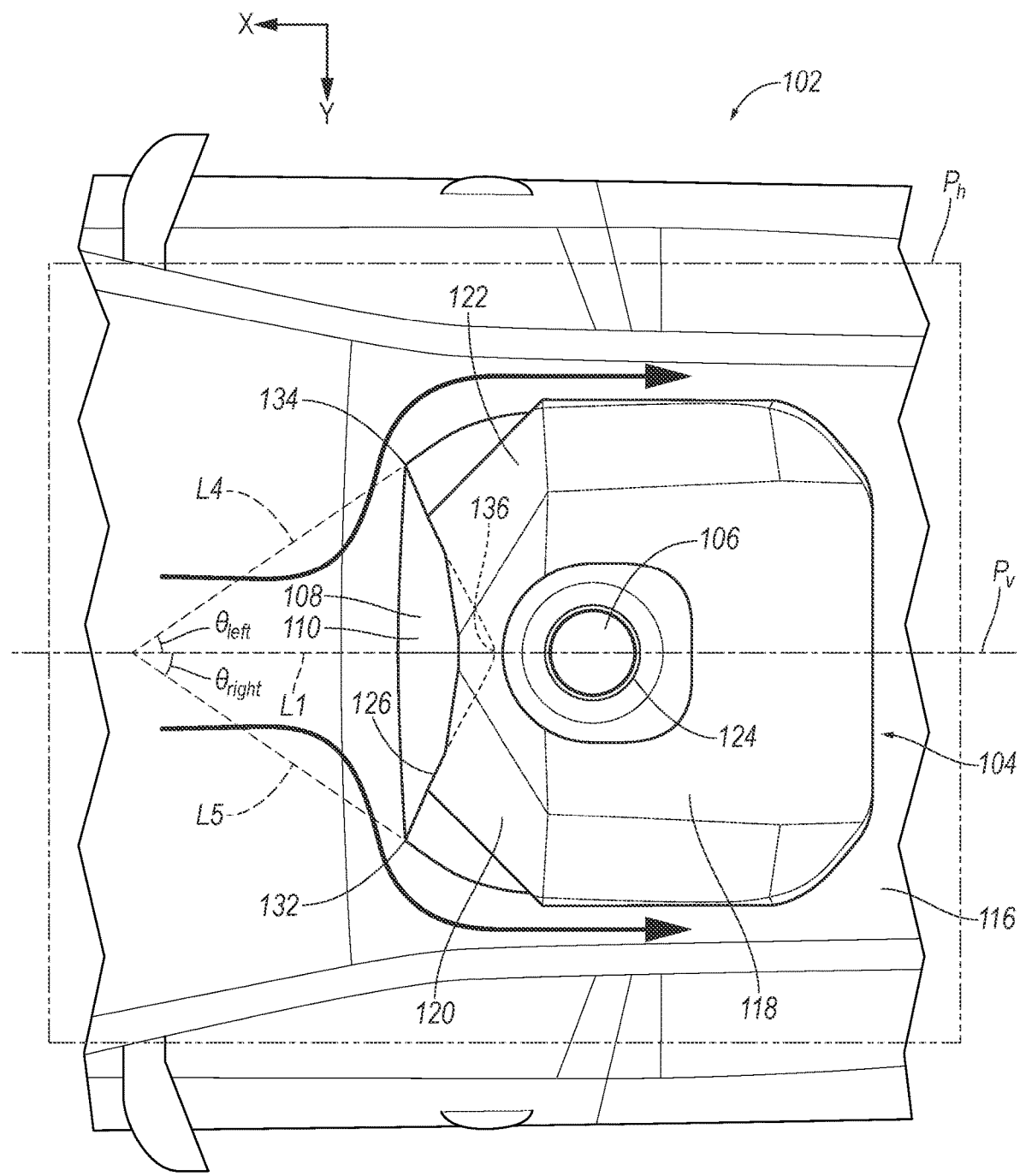
FIG. 4 is a top view of the sensor assembly.

The unique shape of the front panel 108 creates an airflow pattern that can deflect bugs, snow, and other debris in the air away from the sensor 106. The view of the sensor 106 is thus kept clearer. When the vehicle 100 is traveling forward, the concave shape of the front panel 108 along the vertical axis Z can deflect oncoming air upward and forward relative to the vehicle 100. The vertically deflected air can then pass rearward at a height above the sensor 106, as illustrated in FIG. 3. The vertically deflected airflow can deflect oncoming debris above the sensor 106. The shape creates a stagnation zone of relatively still air relative to the vehicle 100 between the vertically deflected airflow and the sensor 106. Because the front panel 108 is concave along the lateral horizontal axis Y in addition to the vertical axis Z, oncoming air is deflected laterally outboard and forward to the vehicle 100. The horizontally deflected air can then pass rearward and not rejoin until behind the sensor 106, as illustrated in FIG. 4. The horizontally deflected air can be prevented from disrupting the stagnation zone in front of the sensor 106.

With reference to FIG. 1, the vehicle 100 may be any passenger or commercial automobile such as a car, a truck, a sport utility vehicle, a crossover, a van, a minivan, a taxi, a bus, etc.

Directional terms such as "front," "forward," "back," "rearward," "longitudinal," "left," "right," "lateral," "horizontal," "vertical," etc., are understood relative to the vehicle 100. Spatial arrangements are explained in terms of a coordinate system defined relative to the vehicle 100. The coordinate system includes a longitudinal horizontal axis X, the lateral horizontal axis Y, and the vertical axis Z. The longitudinal horizontal axis X, the lateral horizontal axis Y, and the vertical axis Z are mutually orthogonal, i.e., orthogonal to each other. The longitudinal horizontal axis X extends forward and rearward relative to the vehicle 100, the lateral horizontal axis Y extends left and right relative to the vehicle 100, and the vertical axis Z extends up and down relative to the vehicle 100.

The vehicle 100 may be an autonomous vehicle. A computer can be programmed to operate the vehicle 100 independently of the intervention of a human operator, completely or to a lesser degree. The computer may be programmed to operate the propulsion, brake system, steering system, and/or other vehicle systems based in part on data received from the sensor 106. For the purposes of this disclosure, autonomous operation means the computer controls the propulsion, brake system, and steering system without input from a human operator; semi-autonomous operation means the computer controls one or two of the propulsion, brake system, and steering system and a human operator controls the remainder; and nonautonomous operation means a human operator controls the propulsion, brake system, and steering system.

The vehicle 100 includes a body 112. The vehicle 100 may be of a unibody construction, in which a frame and the body 112 of the vehicle 100 are a single component. The vehicle 100 may, alternatively, be of a body-on-frame construction, in which the frame supports the body 112 that is a separate component from the frame. The frame and body 112 may be formed of any suitable material, for example, steel, aluminum, etc. The body 112 includes body panels 114 partially defining an exterior of the vehicle 100. The body panels 114 may present a class-A surface, e.g., a finished surface exposed to view by a customer and free of unaesthetic blemishes and defects. The body panels 114 include, e.g., a roof 116, etc.

Figure 2:
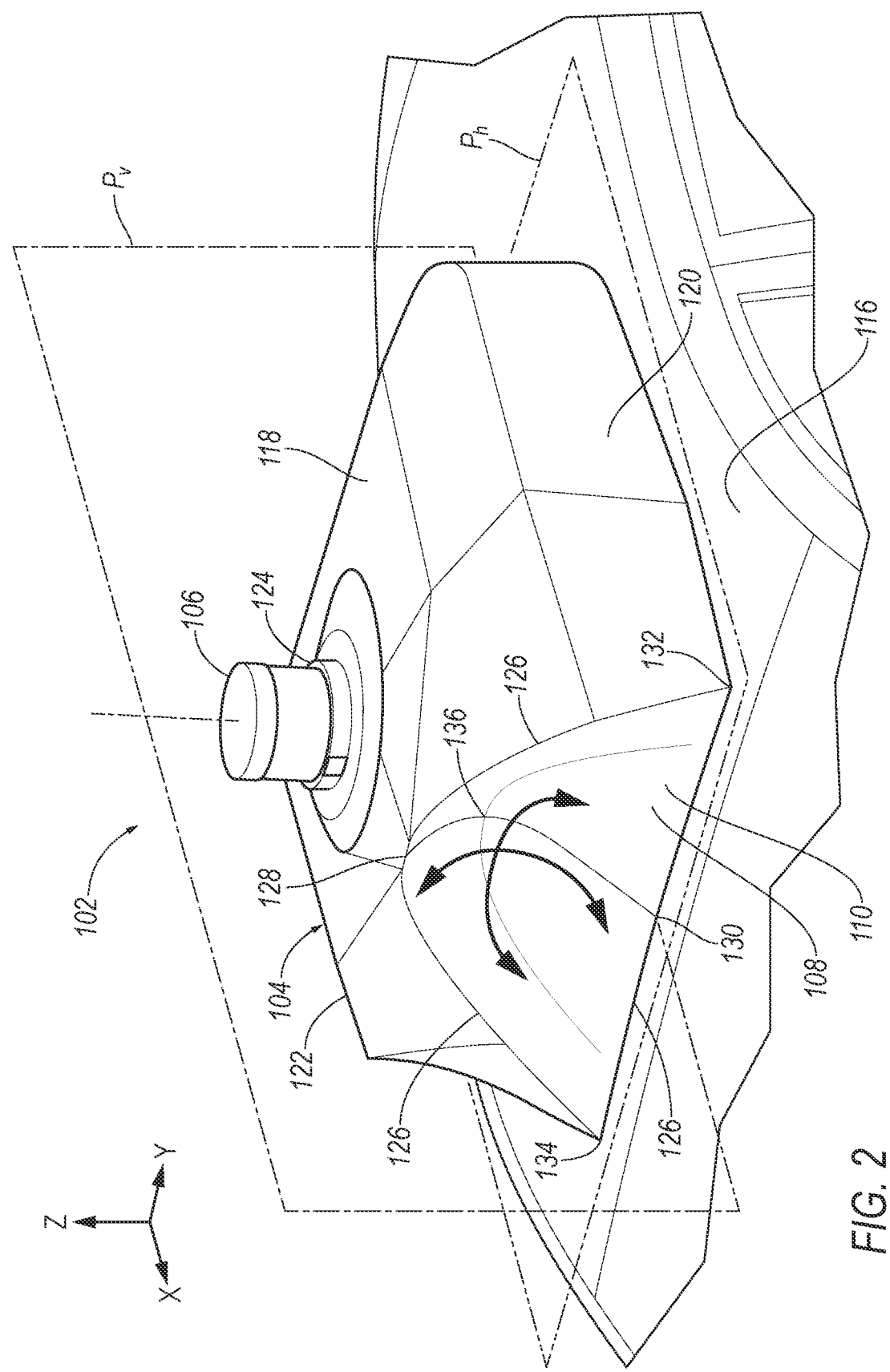
FIG. 2 is a perspective view of the sensor assembly.

With reference to FIG. 2, the housing 104 is mountable to the vehicle 100, e.g., to one of the body panels 114 of the vehicle 100, e.g., the roof 116. For example, the housing 104 may be shaped to be attachable to the roof 116, e.g., may have a shape matching a contour of the roof 116. The housing 104 may be attached to the roof 116, which can provide the sensor 106 with an unobstructed field of view of an area around the vehicle 100. The housing 104 is a rigid structure. The housing 104 may be formed of, e.g., plastic or metal.

The housing 104 includes the front panel 108. The front panel 108 faces in a forward direction relative to the vehicle 100, i.e., along the longitudinal horizontal axis X in the direction of forward travel of the vehicle 100. An entirety of the front panel 108 can be unobstructed in the forward direction relative to the vehicle 100, i.e., is able to be projected in the forward direction without interference.

The housing 104 includes a top panel 118. The top panel 118 faces in an upward direction relative to the vehicle 100, i.e., along the vertical axis Z away from the ground. An entirety of the top panel 118 can be unobstructed in the upward direction relative to the vehicle 100, i.e., is able to be projected in the upward direction without interference. The top panel 118 borders the front panel 108, i.e., touches the front panel 108 along an extended line.

The housing 104 includes a left panel 120 and a right panel 122. The left panel 120 faces left relative to the vehicle 100, i.e., along the lateral horizontal axis Y to the left. The right panel 122 faces right relative to the vehicle 100, i.e., along the lateral horizontal axis Y to the right. The left panel 120 and the right panel 122 extend downward from the top panel 118 to the roof 116. The left panel 120 and the right panel 122 extend rearward from the front surface 110.

The sensor 106 is supported by the housing 104. The sensor 106 is mounted to the housing 104 on top of the housing 104, e.g., at a highest point of the housing 104. Specifically, the sensor 106 can be mounted to the top panel 118. The sensor 106 can be positioned at a lateral center of the vehicle 100, i.e., along a longitudinal midline of the vehicle 100. The sensor 106 can have a cylindrical shape and define an axis A parallel to the vertical axis Z.

The sensor 106 may be designed to detect features of the outside world; for example, the sensor 106 may be a radar sensor, a scanning laser range finder, a light detection and ranging (LIDAR) device, or an image processing sensor such as a camera. In particular, the sensor 106 may be a LIDAR device, e.g., a scanning LIDAR device. A LIDAR device detects distances to objects by emitting laser pulses at a particular wavelength and measuring the time of flight for the pulse to travel to the object and back. The sensor 106 can have a field of view extending horizontally for 360° around the vehicle 100, permitted by the position of the sensor 106 on top of the housing 104.

The sensor assembly 102 includes at least one air nozzle 124, e.g., a plurality of air nozzles 124. The air nozzles 124 are mounted to the top panel 118 adjacent to the sensor 106. For example, the air nozzle or nozzles 124 can encircle the sensor 106. The housing 104 can include a pressurized chamber at a pressure above atmospheric pressure, and the air nozzles 124 can be openings through the top panel 118 to the pressurized chamber. Air is thus forced out through the air nozzles 124. The air nozzles 124 can be oriented to discharge vertically, e.g., creating an air curtain around the sensor 106. The air nozzles 124 can prevent, e.g., rain that enters the stagnation zone in front of the sensor 106 from landing on the sensor 106.

The front panel 108 includes the front surface 110 on an exterior of the housing 104, i.e., facing outward from the housing 104. The front surface 110 includes an outer edge 126 bounding the front surface 110 on the exterior of the housing 104. The outer edge 126 is defined by an edge of the housing 104 against the roof 116 of the vehicle 100 and by a transition of a local curvature of the exterior of the housing 104 from being concave to being flat or convex, i.e., where the exterior of the housing 104 stops being locally concave is the outer edge 126 separating the front surface 110 from the rest of the housing 104. The top panel 118, the left panel 120, the right panel 122, and the roof 116 touch the outer edge 126.

The outer edge 126 includes a topmost point 128, a bottommost point 130, a leftmost point 132, and a rightmost point 134. The topmost point 128 is a point along the outer edge 126 at a most extreme upward position along the vertical axis Z. The bottommost point 130 is a point along the outer edge 126 at a most extreme downward position along the vertical axis Z. The rightmost point 134 is a point along the outer edge 126 at a most extreme rightward position along the lateral horizontal axis Y. The leftmost point 132 is a point along the outer edge 126 at a most extreme leftward position along the lateral horizontal axis Y. The top panel 118 touches the topmost point 128 of the outer edge 126 of the front surface 110. The roof 116 touches the bottommost point 130 of the outer edge 126. The left panel 120 touches the leftmost point 132 of the outer edge 126. The right panel 122 touches the rightmost point 134 of the outer edge 126. The leftmost point 132 and the rightmost point 134 may touch the roof 116.

The front surface 110 includes a rearmost point 136. The rearmost point 136 is a point on the front surface 110 at a most extreme rearward position along the longitudinal horizontal axis X. The rearmost point 136 is spaced from the outer edge 126, i.e., is not along the outer edge 126. The topmost point 128 and the bottommost point 130 are forward of the rearmost point 136 along the longitudinal horizontal axis X, as also seen in FIG. 3. The leftmost point 132 and the rightmost point 134 are forward of the rearmost point 136 along the longitudinal horizontal axis X, as also seen in FIG. 4.

With reference to FIG. 3, the front surface 110 is concave along the vertical axis Z. The front surface 110 extends underneath the top panel 118. The front surface 110 extends downwardly and rearwardly from the top panel 118 and from the topmost point 128. The front surface 110 extends upwardly and rearwardly from the roof 116 and from the bottommost point 130. The front surface 110 smoothly curves from the rearmost point 136 to the topmost point 128 and from the rearmost point 136 to the bottommost point 130. For the purposes of this disclosure, "smoothly curves" means having a slope without discontinuities, i.e., a line that may curve but that lacks kinks or sharp corners.

A line L1 normal to the front surface 110 at the rearmost point 136 and a line L2 normal to the front surface 110 at the topmost point 128 define an angle $\theta_{up}$ projected onto a vertical plane $P_v$ that is parallel to the vertical axis Z and parallel to the longitudinal horizontal axis X. In other words, the line L1 and the line L2 define what is seen in a side view as the angle $\theta_{up}$. "Normal" refers to a line that is perpendicular to a surface. The vertical plane $P_v$ can be a longitudinal vertical plane bisecting the vehicle 100. The angle $\theta_{up}$ is at least 15° and at most 35°. According to computational fluid dynamics (CFD) simulations, values for the angle $\theta_{up}$ in the range from 15° to 35° cause the deflected airflow to extend above the sensor 106. Values of the angle $\theta_{up}$ below 15° can permit the deflected airflow to intersect the sensor 106, and values of the angle $\theta_{up}$ above 35° can cause the deflected airflow to break into turbulent flow in front of the sensor 106.

The line L1 normal to the front surface 110 at the rearmost point 136 and a line L3 normal to the front surface 110 at the bottommost point 130 define an angle $\theta_{down}$ projected onto the vertical plane $P_v$. In other words, the line L1 and the line L3 define what is seen in a side view as the angle $\theta_{down}$. The angle $\theta_{down}$ is at least 15° and at most 35°. According to CFD simulations, values for the angle $\theta_{down}$ in the range from 15° to 35° cause the deflected airflow to extend above the sensor 106. Values of the angle $\theta_{down}$ below 15° can permit the deflected airflow to intersect the sensor 106, and values of the angle $\theta_{down}$ above 35° can cause the deflected airflow to break into turbulent flow in front of the sensor 106.

The front surface 110 is taller than the sensor 106 along the vertical axis Z. In other words, a height measured along the vertical axis Z from the bottommost point 130 to the topmost point 128 is greater than a height of the sensor 106. The sensor 106 is positioned completely above the topmost point 128 along the vertical axis Z. In other words, a bottom of the sensor 106 is higher along the vertical axis Z than the topmost point 128.

With reference to FIG. 4, the front surface 110 is concave along the lateral horizontal axis Y. The front surface 110 extends behind the left panel 120 and the right panel 122. The front surface 110 extends rightwardly and rearwardly from the left panel 120 and from the leftmost point 132. The front surface 110 extends leftwardly and rearwardly from the right panel 122 and from the rightmost point 134. The front surface 110 smoothly curves from the rearmost point 136 to the leftmost point 132 and from the rearmost point 136 to the rightmost point 134.

The line L1 normal to the front surface 110 at the rearmost point 136 and a line L4 normal to the front surface 110 at the leftmost point 132 define an angle $\theta_{left}$ projected onto a horizontal plane $P_h$ that is parallel to the lateral horizontal axis Y and parallel to the longitudinal horizontal axis X. In other words, the line L1 and the line L4 define what is seen in a top view as the angle $\theta_{left}$. The angle $\theta_{left}$ is at least 15° and at most 35°. According to CFD simulations, values for the angle $\theta_{left}$ in the range from 15° to 35° cause the deflected airflow to extend laterally around the sensor 106. Values of the angle $\theta_{left}$ below 15° can permit the deflected airflow to intersect the sensor 106 from the side, and values the angle $\theta_{left}$ above 35° can cause the deflected airflow to break into turbulent flow.

The line L1 normal to the front surface 110 at the rearmost point 136 and a line L5 normal to the front surface 110 at the rightmost point 134 define an angle $\theta_{right}$ projected onto the horizontal plane $P_h$. In other words, the line L1 and the line L5 define what is seen in a top view as the angle $\theta_{right}$. The angle $\theta_{right}$ is at least 15° and at most 35°. According to CFD simulations, values for the angle $\theta_{right}$ in the range from 15° to 35° cause the deflected airflow to extend laterally around the sensor 106. Values of the angle $\theta_{right}$ below 15° can permit the deflected airflow to intersect the sensor 106 from the side, and values the angle $\theta_{right}$ above 35° can cause the deflected airflow to break into turbulent flow.

The rearmost point 136 is in the vertical plane $P_v$, e.g., is in a vertical and longitudinal plane bisecting the vehicle 100, and the front surface 110 is symmetrical across the vertical plane $P_v$. The leftmost point 132 and the rightmost point 134 are equidistant from the vertical plane $P_v$. The angle $\theta_{left}$ is equal, i.e., congruent, to the angle $\theta_{right}$. The housing 104 can be symmetrical across the vertical plane $P_v$, i.e., the top panel 118 can be symmetrical across the plane $P_v$, and the left panel 120 can be symmetrical with the right panel 122 across the plane $P_v$.

The front surface 110 is wider than the sensor 106 along the lateral horizontal axis Y. In other words, a width measured along the lateral horizontal axis Y from the leftmost point 132 to the rightmost point 134 is greater than a width of the sensor 106, e.g., than a diameter of the sensor 106 if the sensor 106 is cylindrical. The sensor 106 is positioned completely between the leftmost point 132 and the rightmost point 134 along the lateral horizontal axis Y. In other words, the leftmost point 132 is farther to the left along the lateral horizontal axis Y than any point on the sensor 106, and the rightmost point 134 is farther to the right along the lateral horizontal axis Y than any point on the sensor 106.

The disclosure has been described in an illustrative manner, and it is to be understood that the terminology which has been used is intended to be in the nature of words of description rather than of limitation. Many modifications and variations of the present disclosure are possible in light of the above teachings, and the disclosure may be practiced otherwise than as specifically described.

What is claimed is:

1. A sensor assembly comprising:
a housing mountable to a vehicle; and
a sensor mounted to the housing on top of the housing;
the housing including a front panel;
the front panel including a front surface on an exterior of the housing;

the front surface being concave along a vertical axis and concave along a lateral horizontal axis orthogonal to the vertical axis; and the front surface being wider than the sensor along the lateral horizontal axis;

the front surface including an outer edge;

the front surface including a rearmost point along a longitudinal horizontal axis orthogonal to the lateral horizontal axis and to the vertical axis;

the rearmost point of the front surface being spaced from the outer edge of the front surface;

the outer edge of the front surface including a leftmost point and a rightmost point along the lateral horizontal axis;

the leftmost and rightmost points being forward of the rearmost point along the longitudinal horizontal axis; and the front surface smoothly curving from the rearmost point to the leftmost point and from the rearmost point to the rightmost point.

2. The sensor assembly of claim 1, wherein the housing includes a top panel to which the sensor is mounted, the top panel borders the front panel, and the front surface extends underneath the top panel.

3. The sensor assembly of claim 2, further comprising at least one air nozzle mounted to the top panel adjacent to the sensor.

4. The sensor assembly of claim 3, wherein the at least one air nozzle is oriented to discharge vertically.

5. The sensor assembly of claim 1, wherein the sensor is cylindrical and defines an axis parallel to the vertical axis.

6. The sensor assembly of claim 1, wherein the front surface is taller than the sensor along the vertical axis.

7. The sensor assembly of claim 1, wherein the outer edge of the front surface includes a topmost point and a bottommost point along the vertical axis, and the topmost and bottommost points are forward of the rearmost point along the longitudinal horizontal axis.

8. The sensor assembly of claim 7, wherein the front surface smoothly curves from the rearmost point to the topmost point and from the rearmost point to the bottommost point.

9. The sensor assembly of claim 7, wherein a line normal to the front surface at the rearmost point and a line normal to the front surface at the topmost point define an angle projected onto a vertical plane that is parallel to the vertical axis and parallel to the longitudinal horizontal axis, and the angle is at least 15°.

10. The sensor assembly of claim 9, wherein the angle is at most 35°.

11. The sensor assembly of claim 7, wherein a line normal to the front surface at the rearmost point and a line normal to the front surface at the bottommost point define an angle projected onto a vertical plane that is parallel to the vertical axis and parallel to the longitudinal horizontal axis, and the angle is at least 15°.

12. The sensor assembly of claim 11, wherein the angle is at most 35°.

13. The sensor assembly of claim 7, wherein the sensor is completely above the topmost point along the vertical axis.

14. The sensor assembly of claim 1, wherein a line normal to the front surface at the rearmost point and a line normal to the front surface at the leftmost point define an angle projected onto a horizontal plane that is parallel to the lateral horizontal axis and parallel to the longitudinal horizontal axis, and the angle is at least 15°.

15. The sensor assembly of claim 14, wherein the angle is at most 35°.

16. The sensor assembly of claim 14, wherein the rearmost point is in a vertical plane that is parallel to the vertical axis and parallel to the longitudinal horizontal axis, and the front surface is symmetrical across the vertical plane.

17. The sensor assembly of claim 1, wherein the sensor is completely between the leftmost point and the rightmost point along the lateral horizontal axis.

18. A sensor assembly comprising:
a housing mountable to a vehicle; and
a sensor mounted to the housing on top of the housing;
the housing including a front panel;
the front panel including a front surface on an exterior of the housing;
the front surface being concave along a vertical axis and concave along a lateral horizontal axis orthogonal to the vertical axis; and
the front surface being wider than the sensor along the lateral horizontal axis;
the front surface including an outer edge;
the front surface including a rearmost point along a longitudinal horizontal axis orthogonal to the lateral horizontal axis and to the vertical axis;
the rearmost point of the front surface being spaced from the outer edge of the front surface;
the outer edge of the front surface including a topmost point and a bottommost point along the vertical axis;
the topmost and bottommost points being forward of the rearmost point along the longitudinal horizontal axis;
a line normal to the front surface at the rearmost point and a line normal to the front surface at the topmost point defining an angle projected onto a vertical plane that is parallel to the vertical axis and parallel to the longitudinal horizontal axis;
the angle being at least 15°; and
the angle being at most 35°.

19. A sensor assembly comprising:
a housing mountable to a vehicle; and
a sensor mounted to the housing on top of the housing;
the housing including a front panel;
the front panel including a front surface on an exterior of the housing;
the front surface being concave along a vertical axis and concave along a lateral horizontal axis orthogonal to the vertical axis; and
the front surface being wider than the sensor along the lateral horizontal axis;
the front surface including an outer edge;
the front surface including a rearmost point along a longitudinal horizontal axis orthogonal to the lateral horizontal axis and to the vertical axis;
the rearmost point of the front surface being spaced from the outer edge of the front surface;
the outer edge of the front surface includes a topmost point and a bottommost point along the vertical axis;
the topmost and bottommost points are forward of the rearmost point along the longitudinal horizontal axis;
a line normal to the front surface at the rearmost point and a line normal to the front surface at the bottommost point defining an angle projected onto a vertical plane that is parallel to the vertical axis and parallel to the longitudinal horizontal axis;
the angle being at least 15°; and
the angle being at most 35°.

* * * * *